United States Patent
Yu

(10) Patent No.: US 8,777,250 B1
(45) Date of Patent: Jul. 15, 2014

(54) SHOCK-ABSORBING SEAT STAY FOR BICYCLE

(71) Applicant: Kuo-Pin Yu, Taichung (TW)

(72) Inventor: Kuo-Pin Yu, Taichung (TW)

(*) Notice: Subject to any disclaimer, the term of this patent is extended or adjusted under 35 U.S.C. 154(b) by 0 days.

(21) Appl. No.: 14/103,172

(22) Filed: Dec. 11, 2013

(30) Foreign Application Priority Data

Dec. 20, 2012 (TW) .............................. 101224704 U

(51) Int. Cl.
*B62K 19/00* (2006.01)
*B62K 19/36* (2006.01)

(52) U.S. Cl.
CPC ..................................... *B62K 19/36* (2013.01)
USPC ............ 280/275; 280/283; 280/284; 280/288

(58) Field of Classification Search
CPC ........ B62K 19/02; B62K 19/16; B62K 19/18; B62K 25/28; B62K 25/286
USPC ............... 280/274, 275, 281.1, 283, 284, 288
See application file for complete search history.

(56) References Cited

U.S. PATENT DOCUMENTS

| | | | | |
|---|---|---|---|---|
| 2,446,731 A * | 8/1948 | Wheler | .......................... | 280/284 |
| 5,098,114 A * | 3/1992 | Jones | ............................. | 280/284 |
| 5,217,241 A * | 6/1993 | Girvin | ............................ | 280/284 |
| 5,496,052 A * | 3/1996 | Tamaishi | ....................... | 280/284 |
| 5,570,896 A * | 11/1996 | Collins | .......................... | 280/284 |
| 5,927,741 A * | 7/1999 | Chi | ................................ | 280/275 |
| 6,092,823 A * | 7/2000 | Busby | ........................... | 280/284 |
| 6,109,637 A * | 8/2000 | Kirk | .............................. | 280/284 |
| 6,276,706 B1 * | 8/2001 | Yih | ............................... | 280/284 |
| 6,406,048 B1 * | 6/2002 | Castellano | .................... | 280/284 |
| 6,626,604 B1 * | 9/2003 | Pinarello | ....................... | 403/196 |
| 7,168,726 B2 * | 1/2007 | Klein | ............................ | 280/284 |
| 7,591,475 B1 * | 9/2009 | Calfee | .......................... | 280/284 |
| 8,540,267 B1 * | 9/2013 | Chubbuck et al. | ............ | 280/276 |
| 2008/0203700 A1 * | 8/2008 | Tseng | ........................... | 280/283 |
| 2011/0018223 A1 * | 1/2011 | McPherson | ................ | 280/281.1 |
| 2012/0013100 A1 * | 1/2012 | Guillemette | ................... | 280/283 |

* cited by examiner

*Primary Examiner* — Joseph M Rocca
*Assistant Examiner* — Marc A Scharich
(74) *Attorney, Agent, or Firm* — Muncy, Geissler, Olds & Lowe, P.C.

(57) ABSTRACT

A shock-absorbing seat stay for a bicycle includes a seat tube connecting mount having a first coupling portion with a first through hole, an extension member, a shock-absorbing member and a fastening unit. The extension member has a second coupling portion with two connecting lugs each having a second through hole in alignment with the first through hole. The shock-absorbing member is made of elastic material and clamped between the first and second coupling portions. The shock-absorbing member is a U-shaped member having two arms each having a third through hole. The fastening unit is inserted in the first through hole, the second though holes and the third through holes to connect the first coupling portion, the second coupling portion and the shock-absorbing member together. The seat stay is light weight and has a proper shock-absorbing function.

18 Claims, 4 Drawing Sheets though holes are aligned with the first through hole. The fastening unit is inserted in the first through hole, the second though holes and the third through holes to connect the first coupling portion, the second coupling portion and the shock-absorbing member together. The fastening unit includes a bolt and a nut threadedly engaged with the bolt.

SHOCK-ABSORBING SEAT STAY FOR BICYCLE

CROSS-REFERENCE TO RELATED APPLICATIONS

This application claims priority from Taiwan Patent Application No. 101224704 filed on Dec. 20, 2012, the entire content of which is incorporated herein by reference.

BACKGROUND OF THE INVENTION

1. Field of the Invention

The present invention relates to shock-absorbing structures of bicycles and more particularly, to a shock-absorbing seat stay for a bicycle.

2. Description of the Related Art

When riding a bicycle on a bumpy road, a bicyclist may feel uncomfortable due to vibration. To ease discomfort of the bicyclist, many bicycles may be equipped at the bicycle frame thereof with a suspension for buffering the vibration. However, the conventional suspension for being installed with the frame of a bicycle usually comprises metal springs, pneumatic device or hydraulic device for achieving the purpose of absorbing vibration, resulting in that the aforesaid conventional suspension is complicated in structure and heavy in weight, and even a part of stepping energy from the bicyclist may be absorbed by the conventional suspension to undesiredly deteriorate the transmission efficiency of energy. Therefore, for a road bicycle built for traveling at high speed with a light-weight specification, the aforesaid conventional suspension composed of metal spring, pneumatic device or hydraulic device is not an appropriate choice. On the other hand, when a bicyclist rides a road bicycle without suspension, the bicyclist may easily and quickly feel tired. Under this circumstance, the bicyclist may have to face a dilemma that he/she can only choose one from a bicycle having high energy transmission efficiency with light weight and a bicycle having suspension that can provide riding comfort.

SUMMARY OF THE INVENTION

The present invention has been accomplished under the circumstances in view. It is an objective of the present invention to provide a shock-absorbing seat stay for a bicycle, which has the advantages of light weight, good energy transmission efficiency and good shock-absorbing effect.

To attain the above-mentioned objective and other objectives, a shock-absorbing seat stay for a bicycle is provided for being connected with a seat tube of the bicycle and comprises a seat tube connecting mount, an extension member, a shock-absorbing member and a fastening unit. The seat tube connecting mount is made of fiber reinforced material and has a seat tube connecting end for connecting the seat tube of the bicycle, and a first coupling portion with a first through hole. The extension member is made of fiber reinforced material and has a connecting section and two branches integrally extending from the connecting section. The connecting section has a second coupling portion, which corresponds to the first coupling portion and has two connecting lugs each provided with a second through hole. The connecting lugs are respectively located at two lateral sides of the first coupling portion in a way that the second through holes are aligned with the first through hole. The shock-absorbing member is made of elastic material and clamped between the first coupling portion and the second coupling portion. The shock-absorbing member is a U-shaped member having a bottom and two arms extending from the bottom and each having a third through hole. One of the arms is located between one of the connecting lugs and the first coupling portion and the other one of the arms is located between the other one of the connecting lugs and the first coupling portion in a way that the third through holes are aligned with the first through hole. The fastening unit is inserted in the first through hole, the second though holes and the third through holes to connect the first coupling portion, the second coupling portion and the shock-absorbing member together. The fastening unit includes a bolt and a nut threadedly engaged with the bolt.

By means of installing a shock-absorbing member made of elastic material between the first coupling portion of the seat tube connecting mount and the second coupling portion of the extension member, the shock-absorbing seat stay of the present invention can provide with an appropriate buffering effect. Compared to the aforesaid conventional suspension, the structural design of the shock-absorbing seat stay of the present invention has the advantage of light weight and will not dramatically deteriorate the transmission efficiency of energy, such that the seat stay of the present invention can provide with a balanced solution to fulfill the multi-dimensional demands of the bicyclist.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
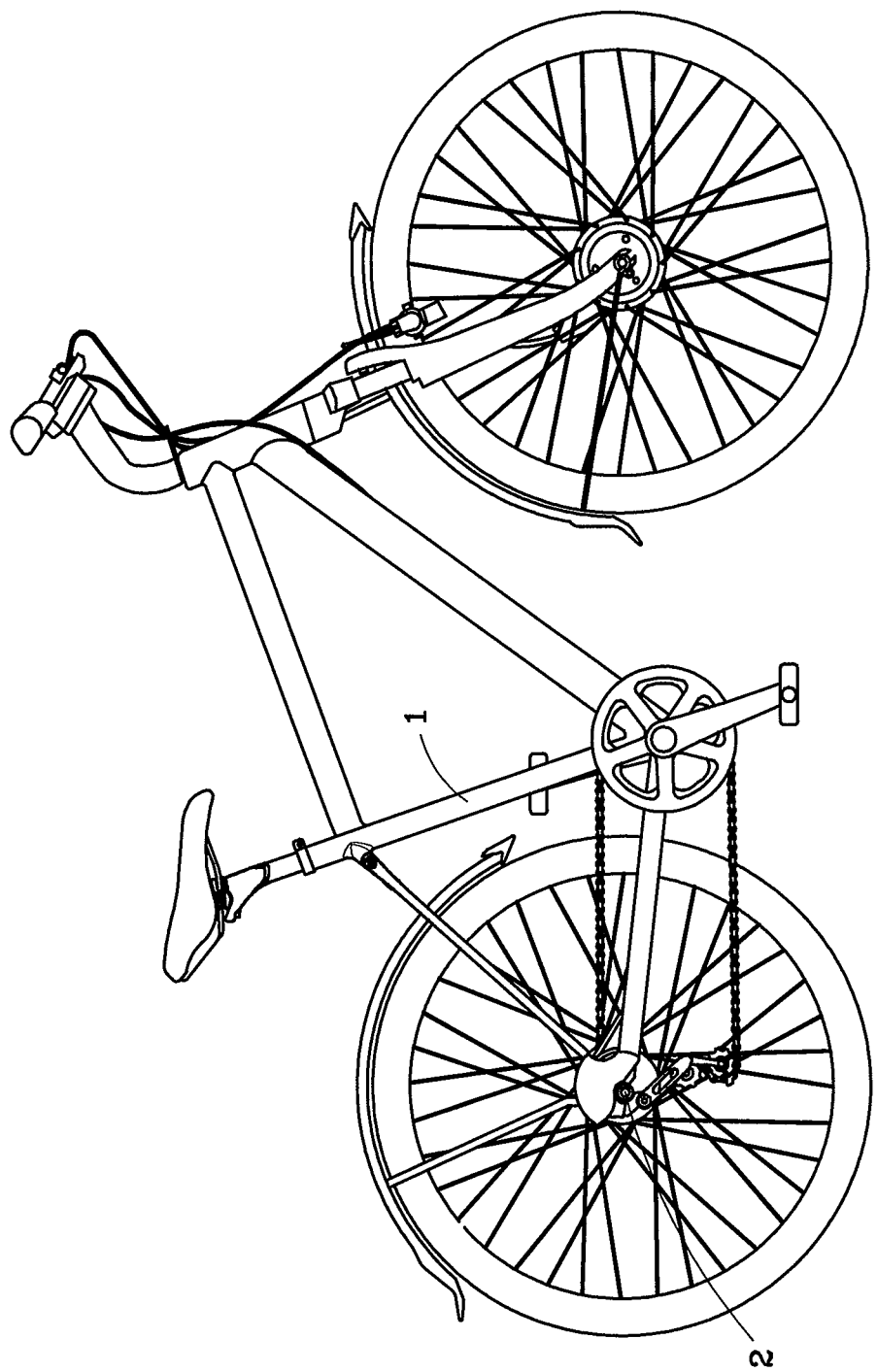
FIG. 1 is a schematic drawing showing that a shock-absorbing seat stay according to a first embodiment of the present invention is applied on a bicycle frame structure.
Figure 2:
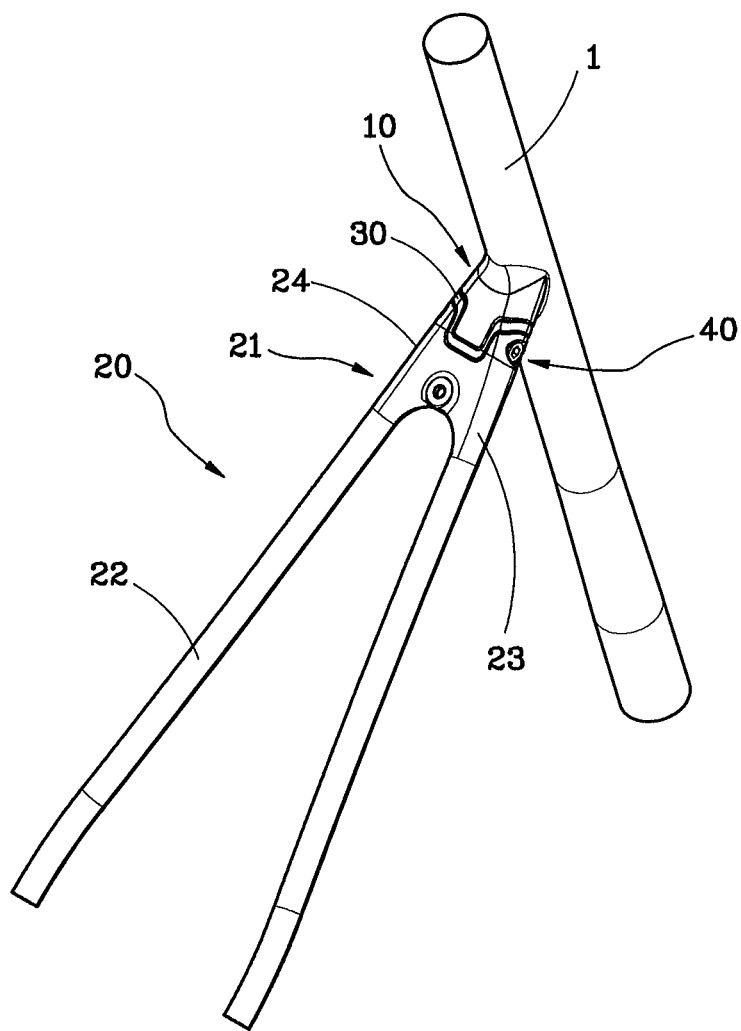
FIG. 2 is a perspective view of the shock-absorbing seat stay of the first embodiment of the present invention.
Figure 3:
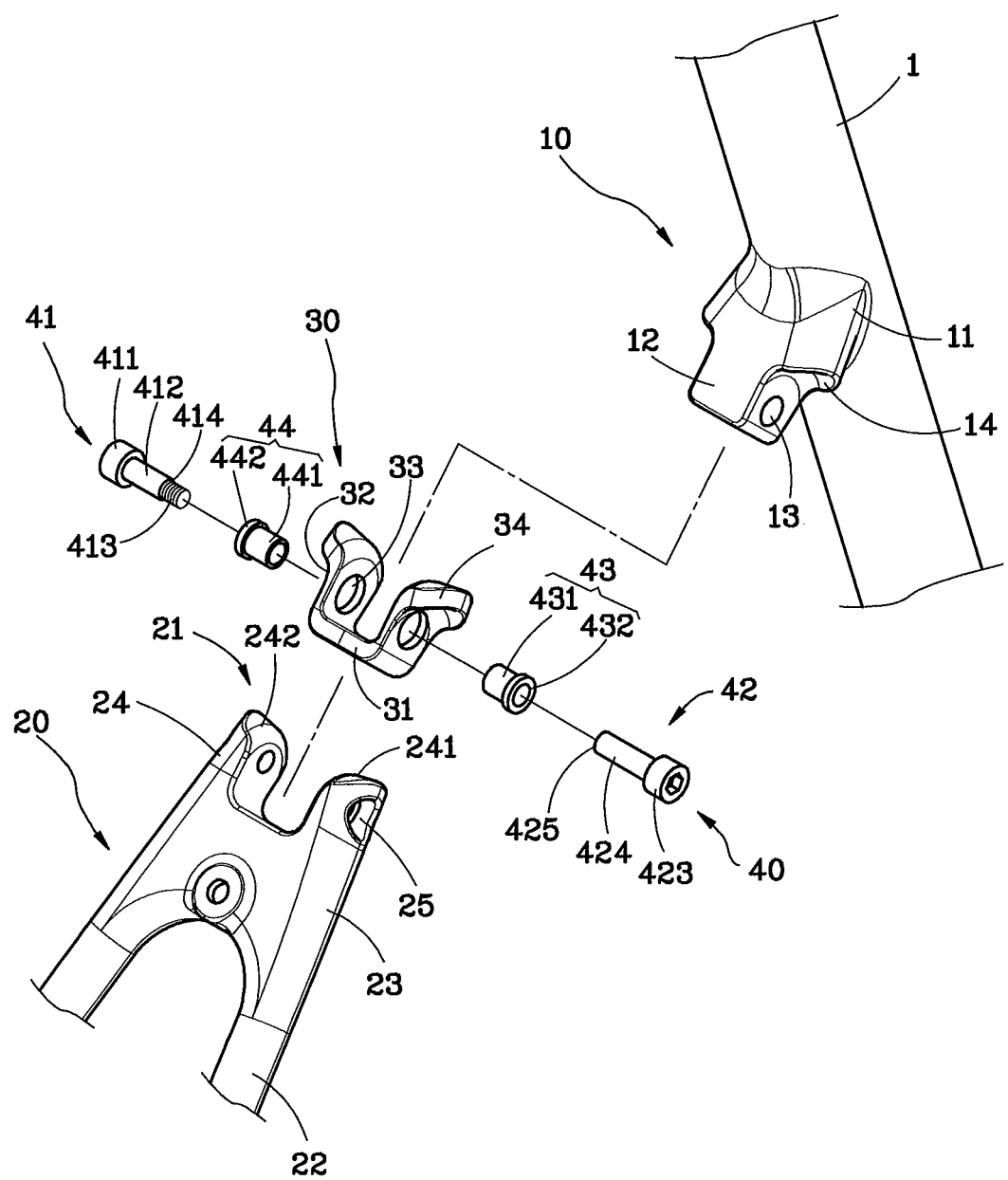
FIG. 3 is an exploded view of the shock-absorbing seat stay of the first embodiment of the present invention.
Figure 4:
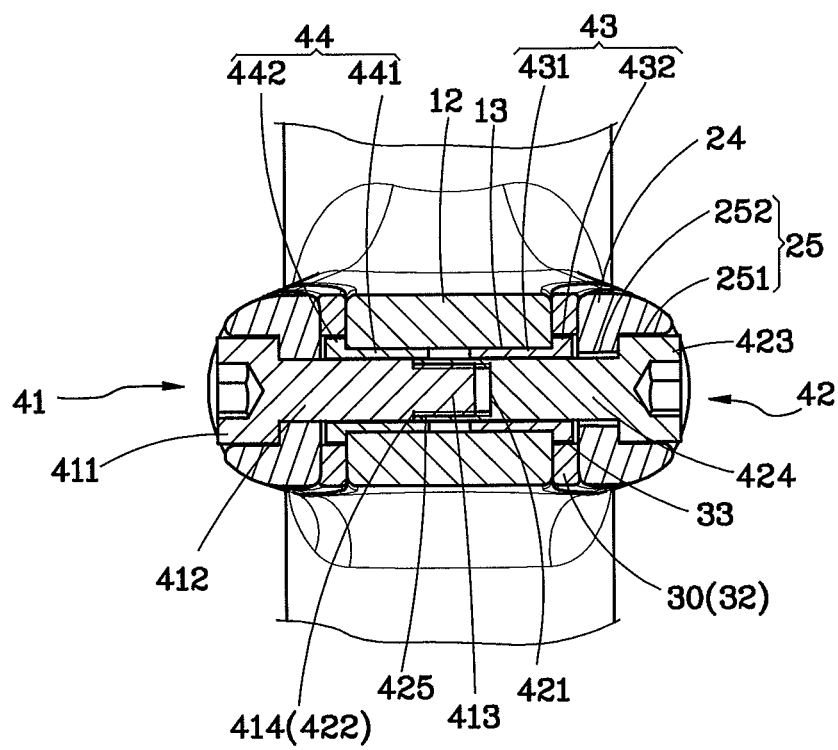
FIG. 4 is a cross-sectional view of the shock-absorbing seat stay of the first embodiment of the present invention.

Referring to FIG. 1, a shock-absorbing seat stay provided by a first embodiment of the present invention is adapted for being connected between a seat tube 1 and a rear hub axle 2 of a bicycle. As shown in FIGS. 2-4, the seat stay comprises a seat tube connecting mount 10, an extension member 20, a shock-absorbing member 30 and a bolt-and-nut fastening unit 40.

The seat tube connecting mount 10 is made of fiber-reinforced materials including, but not limited to, carbon fiber reinforced plastic, glass fiber reinforced plastic and Kevlar fiber reinforced plastic. For the plastics, thermosetting plastics, thermoplastic plastics or a mixture thereof may be used. The seat tube connecting mount 10 includes a seat tube connecting end 11 for being connected with the seat tube 1 of the bicycle, and a first coupling portion 12 having a first through hole 13 substantially extending in a horizontal manner.

The extension member 20 is also made of fiber-reinforced materials and has a connecting section 21 and two branches 22 integrally extending from the connecting section 21. The connecting section 21 includes a second coupling portion 23 having two connecting lugs 24 each provided with a second through hole 25. When the seat stay is assembled, the two connecting lugs 24 are located at two lateral sides of the first coupling portion 12 in such a way that the second through holes 25 and the first through hole 13 are aligned in a line. It is to be understood that the bottom end of the branch 22 may be connected with a rear fork tip (not shown in the drawings) for holding the rear hub axle 2. The aforesaid rear fork tip may be made of, but not limited to, fiber reinforced materials.

The shock-absorbing member 30 is made of elastic materials including, but not limited to, isobutylene isoprene rubber (IIR), silicone rubber, thermoplastic rubber (TPR) or thermoplastic polyurethane (TPU). The shock-absorbing member 30 is clamped between the first coupling portion 12 and the second coupling portion 23. Basically, the shock-absorbing member 30 is a U-shaped member having a bottom 31, two arms 32 extending from the bottom 31, and two third through holes 33 provided at the arms 32, respectively. When the seat stay is assembled, the two arms 32 are respectively located between the two connecting lugs 24 and the first coupling portion 12 in such a way that the third through holes 33 are aligned with the first through holes 13. More specifically speaking, one of the two arms 32 is located between one of the two connecting lugs 24 and the first coupling portion 12 and the other one of the arms 32 is located between the other one of the connecting lugs 24 and the first coupling portion 12 such that the first through hole 13, second through holes 25 and the third through holes 33 are aligned in a line.

The bolt-and-nut fastening unit 40 is inserted in the first through hole 13, the two second through holes 25 and the two third through holes 33 so as to securely connect the first coupling portion 12, the second coupling portion 23 and the shock-absorbing member 30 together. In this embodiment, the fastening unit 40 comprises a bolt 41 and a nut 42, which are threadedly engaged with each other. In this way, the seat tube connecting mount 10, the extension member 20 and the shock-absorbing member 30 can be combinedly and firmly assembled together, resulting in that the vibration from the rear wheel during riding, which will be partially absorbed by the shock-absorbing member 30, will be less transmitted to the seat tube 1.

To prevent the shock-absorbing member 30 from early fatigue or from deterioration in shock-absorbing effect due to an undesired situation that the two arms 32 of the shock-absorbing member 30 are exceedingly clamped by the first coupling portion 12 and the two connecting lugs 24 of the second coupling portion 23, a proper distance may be provided between the first coupling portion 12 and the second coupling portion 23. To achieve this purpose, in this embodiment the bolt 41 is configured having a head 411, a body section 412 and an external threaded section 413, wherein the body section 412 is integrally connected between the head 411 and the external threaded section 413 and the body section 412 has a diameter greater than that of the external threaded section 413, such that a first stop surface 414 facing the nut 42 is formed between the body section 412 and the external threaded section 413. Besides, the nut 42 is provided with a second stop surface 422 for being stopped against the first stop surface 414, and a threaded hole 421 inwardly recessed from the second stop surface 422 for being engaged with the external threaded section 413. Specifically speaking, the nut 42 has a head 423 and a body section 424 extending from the head 423 and provided at a free end 425 thereof with the second stop surface 422. As a result, the bolt 41 and the nut 42 will be limited to be further tighten up when the first stop surface 414 and the second stop surface 422 are stopped with each other, thereby preventing the shock-absorbing member 30 from being exceedingly clamped so as to allow the shock-absorbing member 30 to be elastically deformed.

To prevent the bolt 41 and the nut 42 from protruding out of the extension member 20, the second through hole 25 is provided with a relatively big diameter section 251 for accommodation of the head 411 of the bolt 41 or the head 423 of the nut 42, and a relatively small diameter section 252 for accommodation of the body section 412 of the bolt 41 or the body section 424 of the nut 42. It is to be mentioned that the seat stay of the present invention may be designed in a different way that only one of the two second through holes 25 is provided with the aforesaid relatively big and small diameter sections such that one of the bolt and the nut is arranged slightly protruding out of the extension member, or both of the two second through holes are provided with no such relatively big diameter section.

On another aspect, for preventing scratch and wear of the first and second coupling portions made of fiber reinforced material by the bolt 41 and the nut 42, the fastening unit 40 further comprises two bushings 43 and 44, which are sleeved onto the bolt 41 and the nut 42 respectively so as to prevent the bolt 41 and the nut 42 from direct contact with the first through hole 13 and the second through holes 25. To positively position the bushings 43 and 44, the bushing 43 or 44 is provided with a tube 431 or 441, which is sleeved onto the bolt 41 or the nut 42, and a flange 432 or 442 extending from an end of the tube 431 or 441 and received in one of the two third through holes 33 in such a way that the flanges 432 and 442 are abutted against two lateral sides of the first coupling portions 12, respectively. Further, for preventing the nut 42 from rotation along with the bolt 41 when the bolt 41 is screwingly engaging with the nut 42, the profile of the nut 42 or the profile of the head 423 of the nut 42 may be configured having an oval shape or a noncircular shape and the second through hole 25 is configured having a complementary shape relative to the profile of the nut 42 or the head 423 of the nut 42.

It will be appreciated that the seat stay of the present invention may comprise no above-mentioned bushings and the structure of the bolt or nut is not limited to the one disclosed in the aforesaid embodiment. For example, a nut having a head without the body section may be used in the seat stay of the present invention to achieve same fastening function among parts of the seat stay.

To further enhance the shock-absorbing effect, the shock-absorbing member 30 may comprise two wing portions 34 respectively extending outwardly from the arms 32, and the seat tube connecting mount 10a may comprise two first abutment surfaces 14 at two lateral sides of the first coupling portion 12 respectively, and each connecting lug 24 is provided at its free end 241 with a second abutment surface 242 corresponding to one of the first abutment surfaces 14. Each wing portion 34 is clamped between associated first abutment surface 14 and second abutment surface 242, thereby enhancing the shock-absorbing effect between the seat tube connecting mount 10 and the extension member 20.

Figure 5:
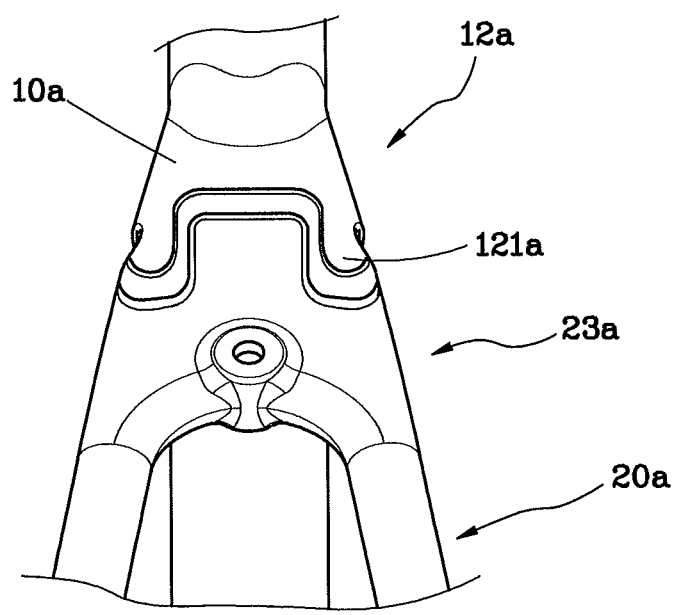
FIG. 5 is a rear view of a shock-absorbing seat stay according to a second embodiment of the present invention.

In aforesaid embodiment, the first coupling portion 12 of the seat tube connecting mount 10 is configured as a male coupling element and the second coupling portion 23 of the extension member 20 is a female coupling element; however, as shown in FIG. 5, in a second embodiment of the present invention, the first coupling portion 12a of the seat tube connecting mount 10 is configured as a female coupling element like the second coupling portion 23 disclosed in the first embodiment, i.e. the first coupling portion 12a is provided with two connecting lugs 121a. To match the first coupling portion of a female coupling element, the second coupling portion 23a of the extension member 20a is configured having a male construction like the first coupling portion 12 disclosed in the first embodiment. Specifically speaking, the structural features of the first coupling portion 12 of the seat tube connecting mount 10 of the first embodiment are completely applied on the second coupling portion 23a of the extension member 20a in the second embodiment, and the structural features of the second coupling portion 23 of the extension member 20 of the first embodiment are completely applied on the first coupling portion 12a of the seat tube connecting mount 10a in the second embodiment. Since the structural features of the male and female coupling elements, which are intactly adopted in the second embodiment, have been fully disclosed in the first embodiment; therefore, no detailed description in this regard is needed in this second embodiment.

It can be aware from the above description and appendix drawings that the design of sandwiching the shock-absorbing member made of elastic material between the seat tube connecting mount and the extension member can provide an appropriate shock-absorbing effect to minimize the sense of fatigue of the bicyclist upon riding and will not extensively deteriorate the rigidity of the bicycle frame to scarify the stepping energy. Further, the shock-absorbing member of the present invention has a weight lighter than that of the conventional suspension, such that the present invention can meet the light-weight trend of the bicycle development so as to fulfill the multi-dimensional demands of the bicyclists.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock-absorbing seat stay for connecting with a seat tube of a bicycle, the shock-absorbing seat stay comprising:
   a seat tube connecting mount made of fiber reinforced material and having a seat tube connecting end, for connecting with the seat tube of the bicycle, and a first coupling portion with a first through hole;
   an extension member made of fiber reinforced material and having a connecting section and two branches integrally extending from the connecting section, wherein the connecting section has a second coupling portion, which corresponds to the first coupling portion and has two connecting lugs each provided with a second through hole, and the connecting lugs are respectively located at two lateral sides of the first coupling portion in a way that the second through holes are aligned with the first through hole;
   a shock-absorbing member made of elastic material and clamped between the first coupling portion and the second coupling portion, the shock-absorbing member being a U-shaped member having a bottom and two arms extending from the bottom and each arm having a third through hole, one of the arms being located between one of the connecting lugs and the first coupling portion and the other one of the arms being located between the other one of the connecting lugs and the first coupling portion in a way that the third through holes are aligned with the first through hole; and
   a fastening unit inserted in the first through hole, the second though holes and the third through holes to connect the first coupling portion, the second coupling portion and the shock-absorbing member together, the fastening unit including a bolt and a nut threadedly engaged with the bolt.

2. The shock-absorbing seat stay as claimed in claim 1, wherein the bolt comprises a head, a body section and an external threaded section; the body section is connected between the head and the external threaded section and has a diameter greater than that of the external threaded section, such that a first stop surface facing the nut is formed between the body section and the external threaded section; the nut is provided with a second stop surface for stopping against the first stop surface, and a threaded hole inwardly recessed from the second stop surface for being engaged with the external threaded section of bolt.

3. The shock-absorbing seat stay as claimed in claim 2, wherein the nut comprises a head and a body section extending from the head of the nut, and the second stop surface is provided at a free end of the body section of the nut.

4. The shock-absorbing seat stay as claimed in claim 3, wherein each of the second through holes comprises a larger diameter section for accommodation of the head of the bolt or the head of the nut, and a smaller diameter section for accommodation of the body section of the bolt or the body section of the nut.

5. The shock-absorbing seat stay as claimed in claim 2, wherein the fastening unit further includes two bushings, which are sleeved onto the bolt and the nut, respectively.

6. The shock-absorbing seat stay as claimed in claim 5, wherein each of the bushings is provided, with a tube and a flange extending from an end of the tube; the tube of one of the bushings is sleeved onto the bolt in a way that the flange of the one of the bushings is received in one of the third through holes, and the tube of the other one of the bushings is sleeved onto the nut in a way that the flange of the other one of the bushings is received in the other one of the third through holes.

7. The shock-absorbing seat stay as claimed in claim 1, wherein the elastic material of the shock-absorbing member is isobutylene isoprene rubber, silicone rubber, thermoplastic rubber or thermoplastic polyurethane.

8. The shock-absorbing seat stay as claimed in claim 1, wherein the shock-absorbing member comprises two wing portions respectively extending outwardly from the arms; the seat tube connecting mount comprises two first abutment surfaces located at the two lateral sides of the first coupling portion, respectively; each of the connecting lugs is provided at a free end thereof with a second abutment surface corresponding to one of the first abutment surfaces; and each of the wing portions is clamped between said corresponding first and second abutment surfaces, respectively.

9. The shock-absorbing seat stay as claimed in claim 1, wherein the nut has a noncircular profile.

10. A shock-absorbing seat stay for connecting with seat tube of a bicycle, the shock-absorbing seat stay comprising:
   a seat tube connecting mount made of fiber reinforced material and having a seat tube connecting end, for connecting with the seat tube of the bicycle, and a first coupling portion having two connecting lugs each provided with a first through hole;
   an extension member made of fiber reinforced material and having a connecting section and two branches integrally extending from the connecting section, the connecting section having a second coupling portion, which corresponds to the first coupling portion and has a second through hole, the connecting lugs being respectively located at two lateral sides of the second coupling portion in a way that the first through holes are aligned with the second through hole;
   a shock-absorbing member made of elastic material and clamped between the first coupling portion and the second coupling portion, the shock-absorbing member being a U-shaped member having a bottom and two arms extending from the bottom and each arm having a third through hole, one of the arms being located between one of the connecting lugs and the second coupling portion and the other one of the arms being located between the other one of the connecting lugs and the second coupling portion in a way that the third through holes are aligned with the second through hole; and a fastening unit inserted in the first through holes, the second though hole and the third through holes to connect the first coupling portion, the second coupling portion and the shock-absorbing member together, the fastening unit including a bolt and a nut engaged with the bolt.

11. The shock-absorbing seat stay as claimed in claim 10, wherein the bolt comprises a head, a body section and an external threaded section; the body section is connected between the head and the external, threaded section and has a diameter greater than that of the external threaded section, such that a first stop surface facing the nut is formed between the body section and the external threaded section; the nut is provided with a second stop surface for stopping against the first stop surface, and a threaded hole inwardly recessed from the second stop surface for being engaged with the external threaded section of the bolt.

12. The shock-absorbing seat stay as claimed in claim 11, wherein the nut comprises a head and a body section extending from the head of the nut, and the second stop surface is provided at a free end of the body section of the nut.

13. The shock-absorbing seat stay as claimed in claim 12, wherein each of the first through holes comprises a larger diameter section for accommodation of the head of the bolt or the head of the nut, and a smaller diameter section for accommodation of the body section of the bolt or the body section of the nut.

14. The shock-absorbing seat stay as claimed in claim 11, wherein the fastening unit further includes two bushings, which are sleeved onto the bolt and the nut, respectively.

15. The shock-absorbing seat stay as claimed in claim 14, wherein each of the bushings is provided with a tube and a flange extending from an end of the tube; the tube of one of the bushings is sleeved onto the bolt in a way that the flange of the one of the bushings is received in one of the third through holes, and the tube of the other one of the bushings is sleeved onto the nut in a way that the flange of the other one of the bushings is received in the other one of the third through holes.

16. The shock-absorbing seat stay as claimed in claim 10, wherein the elastic material of the shock-absorbing member is isobutylene isoprene rubber, silicone rubber, thermoplastic rubber or thermoplastic polyurethane.

17. The shock-absorbing seat stay as claimed in claim 10, wherein the shock-absorbing member comprises two wing portions respectively extending outwardly from the arms; each of the connecting lugs is provided at a free end thereof with a first abutment surface; the extension member comprises two second abutment surfaces located at the two lateral sides of the second coupling portion, respectively, and each second abutment surface corresponding to one of the first abutment surfaces; and each of the wing portions is clamped between said corresponding first and second abutment surfaces, respectively.

18. The shock-absorbing seat stay as claimed in claim 10, wherein the nut has a noncircular profile.

\* \* \* \* \*